United States Patent [19]

Marion et al.

[11] 4,205,962

[45] * Jun. 3, 1980

[54] PROCESS FOR GAS CLEANING WITH RECLAIMED WATER

[75] Inventors: Charles P. Marion, Mamaroneck, N.Y.; Lawrence E. Estabrook, Long Beach; George N. Richter, San Marino, both of Calif.

[73] Assignee: Texaco Inc., White Plains, N.Y.

[*] Notice: The portion of the term of this patent subsequent to Feb. 27, 1996, has been disclaimed.

[21] Appl. No.: 955,544

[22] Filed: Oct. 27, 1978

Related U.S. Application Data

[63] Continuation-in-part of Ser. No. 900,952, Apr. 28, 1978, Pat. No. 4,141,695.

[51] Int. Cl.² .............................. C10J 3/00; C01B 2/14
[52] U.S. Cl. .................................... 48/197 R; 48/201; 48/212; 210/39; 252/373
[58] Field of Search ...................... 48/197 R, 200, 201, 48/212, 215, DIG. 7; 252/373; 202/158; 203/88, 10, 11; 261/114 R, 118, 18 R, 8; 210/39, 40, 33

[56] References Cited

U.S. PATENT DOCUMENTS

| | | | |
|---|---|---|---|
| 3,434,701 | 3/1969 | Bauer | 202/158 |
| 3,980,590 | 9/1976 | Marion | 48/212 |
| 4,141,695 | 2/1979 | Marion et al. | 48/197 R |

*Primary Examiner*—S. Leon Bashore
*Assistant Examiner*—George C. Yeung
*Attorney, Agent, or Firm*—Carl G. Ries; Robert A. Kulason; Albert Brent

[57] ABSTRACT

Dispersions comprising water and particulate solids i.e. carbon and ash are produced in at least one gas cooling or scrubbing zone by quench cooling or scrubbing, or both the raw gas stream from a partial oxidation gas generator with water. Advantageously, the water may be reclaimed by the subject process. In one embodiment, the carbon-water dispersion containing any ash is mixed with a liquid organic extractant and a liquid aqueous emulsion. The emulsion breaks up, and in a decanting operation a carbon-extractant-water dispersion containing gaseous impurities separates out and floats on a dilute bottoms water layer containing gaseous impurities and some solids. The carbon-extractant-water dispersion is mixed with a heavy liquid hydrocarbon and introduced into a distillation column. The overhead from the distillation column is cooled and separated in a separation vessel into an upper layer of liquid organic extractant, an intermediate layer of aqueous emulsion, a bottom layer of water, and an overhead stream of uncondensed gaseous impurities if any. The liquid aqueous emulsion and the liquid extractant are recycled to the decanting operation. The water layer from the separation vessel and the bottoms water from the decanting operation are separately introduced into a flash column where the water is reclaimed. The flash column includes at least one stripping plate and two chambers at the bottom separated by a weir. The overhead from the flash column is cooled below the dew point and is introduced into said separation vessel. In another scheme, the emulsion is mixed with the bottoms water from the decanting operation and fed to a flash column for reclaiming water. Alternately, the aqueous emulsion is broken-up into water and liquid hydrocarbon by heating.

31 Claims, 3 Drawing Figures

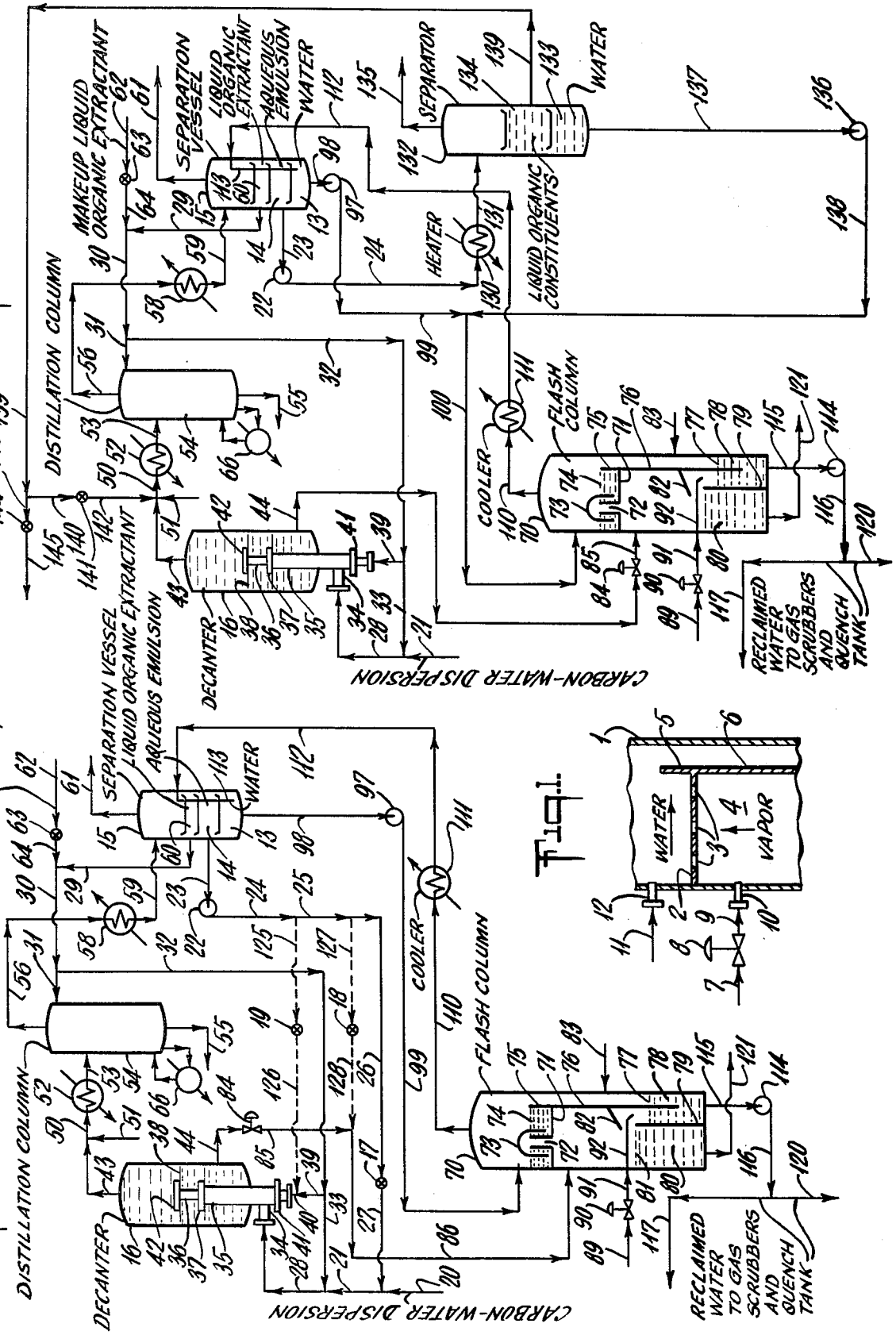

4,205,962

PROCESS FOR GAS CLEANING WITH RECLAIMED WATER

This application is a continuation-in-part of our application Ser. No. 900,952 filed Apr. 28, 1978, now U.S. Pat. No. 4,141,695.

BACKGROUND OF THE INVENTION

1. Field of the Invention

This process pertains to the recovery of water from a carbon-water dispersion, while simultaneously resolving a liquid aqueous emulsion that forms downstream in the system. The carbon-water dispersion is produced during quench cooling and scrubbing the raw gas stream from a partial oxidation gas generator.

2. Description of the Prior Art

Synthesis gas mixtures comprising hydrogen and carbon oxides, and containing entrained particulate carbon may be prepared by the partial oxidation of a fossil fuel with a free-oxygen containing gas, optionally in the presence of a temperature moderator. The hot effluent gas stream from the gas generator may be cooled by direct immersion in water in a quench drum such as described in coassigned U.S. Pat. Nos. 2,896,927 and 3,929,429. A portion of the entrained solids are removed by the quench water. Alternatively, the hot effluent gas stream may be cooled in a gas cooler such as shown in coassigned U.S. Pat. No. 3,920,717 and then scrubbed with water. The quench-water or the scrubbing water may be then processed in the manner, for example, as described in coassigned U.S. Pat. Nos. 2,992,906, 3,097,081, and 4,014,786.

SUMMARY

Particulate solids i.e. carbon soot and ash entrained in the hot raw gas stream from a partial oxidation gas generator are removed by quench cooling the hot gas stream directly in water in a quench drum, or by scrubbing with water in a gas scrubbing zone after indirect heat exchange in a gas cooler or both. By this means, a clean gas stream and a dispersion of particulate solids i.e. carbon and ash are produced. Depending on gas composition, the clean gas stream is intended for use as synthesis gas, reducing gas, or fuel gas. It is economic to reclaim the water in the aforesaid dispersion by removing particulate solids and gaseous impurities. However, in the reclaiming operation troublesome pumpable aqueous emulsions form in the system and have to be removed. The reclaimed water may be then recycled to the gas quench cooling and scrubbing zone.

In the subject continuous process, a carbon-water dispersion containing any ash from the gas quenching or cleaning zones, or both is mixed with a liquid organic extractant and an aqueous emulsion produced subsequently in the process. The emulsion breaks-up, and in a decanting operation a carbon-extractant-water dispersion containing gaseous impurities separates out and floats on a dilute bottoms layer of water containing gaseous impurities and ash. The carbon-extractant-water dispersion is removed from the decanting operation and mixed with a heavy liquid hydrocarbon. The mixture is then heated and passed into a distillation column. A slurry of carbon and heavy hydrocarbon fluid is removed from the bottom of the distillation column and passed into the gas generator as a portion of the feedstock. The overhead stream from the distillation column is cooled to separate by gravity in a separation vessel an upper layer of liquid organic extractant, an intermediate layer of liquid aqueous emulsion, and a bottom layer of water. Any uncondensed gaseous impurities, if present, from the group $H_2S$, $NH_3$, $CO_2$, hydrocarbon vapors, or mixtures thereof may be removed from the top of said separation vessel. The pumpable liquid aqueous emulsion principally comprises water, heavy oil, naphthenic acids, and liquid organic extractant. It is economically disposed of, by means of the subject invention, without polluting the atmosphere. In a preferred embodiment, at least a portion of the liquid organic extractant and the aqueous emulsion are recycled to either a one or two-stage decanting operation. For example, in one embodiment employing a one-stage decanter, at least a portion of the liquid organic extractant and all of the aqueous emulsion are recycled to the decanter in admixture with the dispersion of carbon-water feed. When a two-stage decanter is employed, from 0 to 100 weight % of the aqueous emulsion is mixed with the carbon-water dispersion and a portion of the liquid organic extractant and introduced into the decanter in the first stage. Simultaneously, the remaining portions of said liquid organic extractant and said aqueous emulsion, if any, are introduced into the decanter in the second stage. More specifically, in one embodiment using a two-stage decanter, all of the aqueous emulsion is mixed with the carbon-water dispersion and a portion of the liquid organic extractant and introduced into the decanter in the first stage. Simultaneously, the remainder of the liquid organic extractant is introduced into the decanter in the second stage. In another embodiment of the two-stage decanter, a portion of the liquid organic extractant is mixed with the carbon-water dispersion in the first stage, and all of the aqueous emulsion is mixed with the remainder of the liquid organic extractant going into the second stage. In another two-stage embodiment, a portion of the aqueous emulsion may be introduced in admixture with the carbon-water dispersion and a portion of the extractant in the first-stage, and the remainder of the liquid aqueous emulsion is introduced in admixture with the remainder of the liquid extractant in the second-stage. The water layer from the separation vessel and the bottoms water from the decanting operation are separately introduced into a flash column where the water is reclaimed. The flash column includes at least one stripping plate and two chambers at the bottom separated by a weir. Solids settle out of the water in the first chamber and clarified water flows over the weir into the second chamber. Overflow water from the bottom stripping plate is discharged below the water-level in the second chamber by way of a down-comer. Reclaimed water is pumped to said gas cooling and scrubbing zones from the second chamber, and waste water containing solids in the first chamber is discharged from the system. The overhead from the flash column is cooled below the dew point and is introduced into said separation vessel wherein uncondensed gaseous impurities from the group $H_2S$, $NH_3$, $CO_2$, hydrocarbon vapor, and mixtures thereof are separated from the condensate.

In still another embodiment, the liquid aqueous emulsion is mixed with the dilute bottoms water from one or two-stage decanters and the mixture is then introduced into the flash column. In such case, the decanter may be operated in the usual manner and without the introduction of the aqueous emulsion. Reclaimed water with a reduced content of particulate solids i.e. carbon, and ash, and free from hydrocarbon and containing a reduced amount of gaseous impurities i.e., $H_2S$, $NH_3$, and $CO_2$ is removed from the flash column and recycled to the gas quench or cleaning zones, or both to cool and clean the process gas stream.

In one further embodiment, the liquid aqueous emulsion is broken by heating say at a temperature greater than 140° F. and separated into a water layer and a liquid hydrocarbon layer. The water layer is introduced into the flash column for reclamation of water, as previously described. The liquid hydrocarbon layer is mixed with the overhead carbon-extractant-water dispersion from one or two step decanters and introduced into the distillation column. The overhead from the flash column is cooled to a temperature below the dew point and introduced into the separation vessel following the distillation column.

BRIEF DESCRIPTION OF THE DRAWING

The invention will be further understood by reference to the accompanying drawing.

FIG. 1 of the drawing is a portion of the water-flash column showing a crossflow sieve type stripping plate and the direction of flow for liquid and vapor streams.

FIGS. 2 and 3 of the drawing are schematic representations of preferred embodiments of the process.

DESCRIPTION OF THE INVENTION

In the partial oxidation process for producing mixtures of gases comprising $H_2$ and CO, the raw process gas stream contains entrained particulate solids i.e. carbon and ash. The particulate solids are removed by quenching or scrubbing, or both with water. A dispersion of water and particulate carbon is produced. A liquid organic extractant such as naphtha is used to separate the water from the carbon in a conventional decanting operation, including so called one-stage and two stage processes. For example of one and two-stage decanting operations, reference is made to co-assigned U.S. Pat. Nos. 2,992,906 and 4,014,786.

To recover the liquid organic extractant, a heavy liquid hydrocarbon is added to the carbon-liquid organic extractant-water dispersion. The liquid organic extractant may be then separated by distillation and recovered in an accumulator or separation tank such as described in coassigned U.S. Pat. No. 2,992,906. However, a problem arises when impurities in the feedstreams to the system produce emulsions in the accumulator tank that upset the system. Advantageously by the subject invention, these emulsion problems are overcome and costly downtime is avoided.

In the subject process, a raw gas stream, substantially comprising $H_2$, CO, $H_2O$, and at least one gas from the group $CO_2$, $H_2S$, COS, $CH_4$, $NH_3$, $N_2$, Ar and containing entrained solids i.e. particulate carbon, ash is produced by partial oxidation of a hydrocarbonaceous fuel with a free-oxygen containing gas, optionally in the presence of a temperature moderator, in the reaction zone of an unpacked free-flow noncatalytic partial-oxidation gas generator. The atomic ratio of free oxygen to carbon in the fuel (O/C ratio), is in the range of about 0.6 to 1.6, and preferably about 0.8 to 1.4. The reaction time is in the range of about 1 to 10 seconds, and preferably about 2 to 6 seconds. When steam is used as the temperature moderator the steam-to-fuel weight ratio in the reaction zone is in the range of about 0.1 to 5, preferably about 0.2 to 0.7.

The raw gas stream exits from the reaction zone at a temperature in the range of about 1300° to 3000° F., and preferably 2000° to 2800° F., and at a pressure in the range of about 1 to 250 atmospheres, and preferably 15 to 150 atmospheres.

The composition of the raw gas stream leaving the gas generator is about as follows, in mole percent on a dry basis: $H_2$ 60 to 29, CO 20 to 57, $CO_2$ 2 to 30, $CH_4$ nil to 25, $H_2S$ nil to 2, COS nil to 0.1, $NH_3$ nil to 0.1, $N_2$ nil to 60, and $A_r$ nil to 0.5. Water is present in the gas in the range of about 1 to 75 mole %. Particulate carbon is present in the range of about 0.5 to 20 weight % (basis carbon content in the original feed). Ash may be present. Depending on the composition, the gas stream may be employed as synthesis gas, reducing gas, or fuel gas.

The gas generator comprises a vertical cylindrically shaped steel pressure vessel lined with refractory, such as shown in coassigned U.S. Pat. No. 2,809,104. A typical quench drum for cooling the hot effluent stream of gas from the reaction zone to a temperature in the range of about 300° to 600° F. by direct contact with water is also shown in said patent. At least a portion of the entrained solids i.e. particulates carbon, ash, are removed from the process gas stream by the turbulent quench water and a pumpable dispersion of particulate carbon and water containing about 0.1 to 4.0 wt.% particulate solids is produced in the quench tank. Any remaining entrained solids may be removed from the process gas stream by additional scrubbing with water. A burner, such as shown is coassigned U.S. Pat. No. 2,928,460, may be used to introduce the feed streams into the reaction zone.

Alternatively, the hot effluent gas stream leaving the gas generator may be cooled to a temperature in the range of about 350° F. to 750° F. but above the dew point of water by indirect heat exchange with water in a gas cooler, such as shown and described in coassigned U.S. Pat. No. 3,920,717. The cooled process gas stream is then cleaned by scrubbing with water in a conventional gas scrubbing zone. For example, the venturi or jet scrubber as shown in Perry's Chemical Engineer's Handbook, Fifth Edition, McGraw-Hill Book Company 1973, FIGS. 20–120 and FIGS. 20–121.

In one embodiment, both methods of cooling the effluent gas stream from the gas generator are employed. The effluent gas stream is split into two separate gas streams which are processed in two separate trains. A portion of the hot effluent gas stream is cooled by indirect heat exchange in a gas cooler in the first train; and the remainder of the gas stream is cooled by direct contact with water in a quench tank in the second train.

A wide range of combustible carbon-containing organic materials may be reacted in the gas generator with a free-oxygen containing gas, optionally in the presence of a temperature-moderating gas, to produce the raw gas stream.

The term hydrocarbonaceous as used herein to describe various suitable feedstocks is intended to include gaseous, liquid, and solid hydrocarbons, carbonaceous materials, and mixtures thereof. In fact, substantially any combustible carbon-containing organic material, or slurries thereof, may be included within the definition of the term "hydrocarbonaceous". For example, there are (1) pumpable slurries of solid carbonaceous fuels, such as particulate carbon dispersed in a vaporizable liquid carrier, such as water, liquid hydrocarbon fuel, and mixtures thereof; and (2) gas-liquid-solid dispersions, such as atomized liquid hydrocarbon fuel and particulate carbon dispersed in a temperature moderating gas.

The term liquid hydrocarbon, as used herein to describe suitable liquid feedstocks, is intended to include various materials, such as liquefied petroleum gas, petroleum distillates and residua, gasoline, naphtha, kerosine, crude petroleum, asphalt, gas oil, residual oil, tar-sand and shale oil, coal derived oil, aromatic hydrocarbons (such as benzene, toluene, xylene fractions), coal tar, cycle gas oil from fluid-catalytic- cracking operations, furfural extract of coker gas oil, and mixtures thereof.

Gaseous hydrocarbon fuels, as used herein to describe suitable gaseous feedstocks, include methane, ethane, propane, butane, pentane, natural gas, coke-oven gas, refinery gas, acetylene tail gas, ethylene off-gas, and mixtures thereof. Solid, gaseous, and liquid feeds may be mixed and used simultaneously; and these may include paraffinic, olefinic, acetylenic, naphthenic, and aromatic compounds in any proportion.

Also included within the definition of the term hydrocarbonaceous are oxygenated hydrocarbonaceous organic materials including carbohydrates, cellulosic materials, aldehydes, organic acids, alcohols, ketones, oxygenated fuel oil, waste liquids and by-products from chemical processes containing oxygenated hydrocarbonaceous organic materials, and mixtures thereof.

The hydrocarbonaceous feed may be at room temperature, or it may be preheated to a temperature up to a high as about 600° to 1200° F. but preferably below its cracking temperature. The hydrocarbonaceous feed may be introduced into the gas-generator burner in liquid phase or in a vaporized mixture with the temperature moderator.

The need for a temperature moderator to contol the temperature in the reaction zone depends in general on the carbon-to-hydrogen ratios of the feedstock and the oxygen content of the oxidant stream. A temperature moderator may not be required with some gaseous hydrocarbon fuels, however, generally one is used with liquid hydrocarbon fuels and with substantially pure oxygen. Steam may be introduced as a temperature moderator in admixture with either or both reactant streams. Alternatively, the temperature moderator may be introduced into the reaction zone of the gas generator by way of a separate conduit in the burner. Other temperature moderators include: $CO_2$, $N_2$, a cooled portion of the effluent gas stream from the gas generator, and mixtures thereof.

The term free-oxygen containing gas as used herein means air, oxygen-enriched-air i.e. greater than 21 mole % $O_2$, and substantially pure oxygen, i.e. greater than about 95 mole % oxygen (the remainder usually comprising $N_2$ and rare gases). Free-oxygen containing gas may be introduced by way of the partial-oxidation burner at a temperature in the range of about ambient to 1800° F.

All of the raw gas exiting from the reaction zone of the gas generator may be cooled and scrubbed with water by being directly introduced into a quench tank. Alternately the hot raw gas stream may be cooled in a gas cooler and then scrubbed with water. In another embodiment, the hot raw gas stream from the gas generator is split into two streams which are then simultaneously processed in two separate trains. In the first train no water-gas shifting takes place, whereas in the second train water-gas shifting of the crude gas stream does take place. By this means, the product gas from the second train has a greater mole ratio of $H_2/CO$ than that produced in the first train.

The split of the raw synthesis gas between the two trains may be calculated by material and heat balances. The calculated split may be then adjusted, if necessary, during actual operation. Accordingly, said calculations take into consideration the compositions of the hydrocarbonaceous fuel and the raw synthesis gas, the amount and desired composition of the clean purified synthesis gas product stream, the desired amount of hydrogen-rich product gas, the desired amount and efficiency of the catalytic water-gas shift conversion, and the desired amount of by-product steam. For example, from about 0 to 100 volume %, such as about 5 to 95 volume % of the raw gas stream leaving the reaction zone of the gas generator may be directly introduced into a quench drum containing water in the second train. When the feed to the gas generator includes a high ash fuel, such as coal, at least about 5–10 volume % of the raw gas stream may be introduced into the quench drum to carry the slag. The remainder of the synthesis gas from the gas generator may be passed through an insulated transfer line, and directly into a gas cooler in the first train. There the hot gases are passed in indirect heat exchange with boiling water, thereby cooling the gas stream to a temperature in the range of about 350° to 750° F. while simultaneously producing by-product steam.

The by-product steam may be used elsewhere in the process where required. Further, it may be produced at a pressure which is greater than that in the gas generator. Portions of the by-product steam may be used, for example, as the temperature moderator in the gas generator, as a carrier for the hydrocarbonaceous fuel, or as the working fluid in an expansion turbine; i.e., turbocompressor or turboelectric generator. The steam may also be used to power an air-separation unit that produces the substantially pure oxygen used in the gas generator.

The amount of solid particles i.e., selected from the group: particulate carbon, ash, and mixtures thereof, entrained in the raw gas stream leaving the reaction zone is dependent on the type of hydrocarbonaceous fuel and the atomic ratio (O/C) in the reaction zone. A minimum amount of entrained particulate carbon i.e., about 1–2 wt.% (basis weight of C in the hydrocarbonaceous feed), is recommeded to increase the life of the refractory lining the gas generator when the feed contains Ni and V impurities.

The quench drum, also known as the quench tank, is located below the reaction zone of the gas generator. The stream of raw gas which it receives for cooling and cleaning carries with it substantially all of the ash and a substantial part of the particulate carbon soot leaving the reaction zone of the gas generator. A dispersion is produced in the quench tank comprising quench water, about 0.1 to 4.0 wt. % of particulate solids i.e. carbon and ash, and a minor amount of water soluble impurities. Any unburned inorganic solids such as coarse ash from solid fuels and refractory may accumulate at the bottom of the quench tank. Periodically, this material may be removed as a water slurry through a conventional lock-hopper system. Optionally, water may be separated from this slurry by conventional means i.e. gravity settling, flotation, centrifuge, or filtration. The water may be recycled in the process for further purification along with the quench water.

To prevent plugging any downstream catalyst beds a secondary gas cleaning zone preferably follows the quench tank. The secondary gas cleaning zone may include conventional orifice and venturi scrubbers and sprays by which the process gas stream is scrubbed with reclaimed water. The scrub water containing less than about 0.1 wt.% solids is preferably recycled to the quench tank. By this means the amount of solid particles in the process gas stream may be reduced to less than about 3 parts per million (PPM), and preferably less than about 1 ppm. The mole ratio of $H_2O/CO$ in the process gas stream may be thereby increased to value in the range of about 2 to 5, and preferably 2.5 to 3.5 by vaporizing water during the quenching and scrubbing steps that may follow. This ratio is suitable for the water-gas shift reaction which may take place next.

Thus, after leaving the secondary gas scrubbing zone, the soot-free gas stream may be introduced into a conventional catalytic water-gas shift reaction zone at an inlet temperature in the range of about 350° to 775° F. CO and $H_2O$ in the process gas stream are reacted over a conventional water-shift catalyst which may comprise iron oxide mixed with Cr oxide and promoted by 1 to 15 wt.% of an oxide of another metal, such as K, Th, U, Be, or Sb. Reaction occurs at about 500° to 1050° F. Alternatively, cobalt molybdate on alumina may be used as the water-gas shift catalyst at a reaction temperature in the range of about 500° to 900° F. Co-Mo catalysts comprise, in weight percent: CoO 2–5, $MoO_3$ 8–16, MgO nil-20, and $Al_2O_3$ 59–85. A low-temperature shift catalyst for use with sulfur-free gas streams comprises a mixture of copper and zinc salts or oxides in a weight ratio of about ½ to 3 parts by weight zinc to 1 part copper.

Substantially all of the $H_2O$ may be next removed from the gas stream. For example, the clean gas stream may be cooled to a temperature below the dew point of water by conventional means to condense out and to separate $H_2O$. If desired, the gas stream may be substantially dehydrated by contact with the desiccant, such as alumina. With oxygen gasification, a clean shifted product gas stream is thereby produced having the following composition in mole %. $H_2$ 98 to 60, CO nil to 5, $CO_2$ 15 to 40, $CH_4$ nil to 5, $H_2O$ nil to 5, Ar nil to 0.5, $N_2$ nil to 1, $H_2S$ nil to 2, and $NH_3$ nil to trace.

When at least a portion of the raw gas from the gas generator is cooled in a gas cooler, the cooled process gas stream leaving the gas cooler is scrubbed with boiler feed water in a conventional gas scrubbing zone to remove particulate solids i.e. carbon and ash. A dispersion of scrubbing water containing about 0.1 to 4.0 wt.% of particulate solids and a minor amount i.e. in PPM (part per million) of water soluble impurities is produced. The gas stream leaving the gas scrubbing zone is optionally cooled below the dew point and is then introduced into a knockout or separation vessel. With oxygen gasification, a clean unshifted product gas stream is thereby produced having the following composition in mole %: $H_2$ 60 to 29, CO 20 to 57, $CO_2$ 2 to 30, $CH_4$ nil to 25, $H_2S$ nil to 2, COS nil to 0.1, $H_2O$ nil to 20, $NH_3$ nil to trace, $N_2$ nil to 1, and Ar nil to 0.5.

As previously described, the gas cooler cools the hot raw synthesis gas by indirect heat exchange with boiler feed water. A small blowdown stream is periodically taken from the water being vaporized to control the build up of dissolved solids in the water. The blowdown water leaving the gas cooler may contain a minor amount (in PPM) of metal salts i.e. chlorides, sulfates, and phosphates. The blow-down water streams leaves the gas cooler i.e. waste-heat boiler at a temperature in the range of about 300°–600° F., say about 550° F.

In the process of the invention the dispersion of water-particulate solids from the quench tank or from the scrubbing zones or from both are mixed with a liquid aqueous emulsion and with a liquid organic extractant such as light hydrocarbons i.e. naphtha as produced subsequently in the process. The liquid aqueous emulsion is broken-up, and the mixture is passed into a decanting zone. Conventional horizontal and vertical decanters may be employed. The liquid organic extractant and aqueous emulsion may be added in one or two stages. A further description of suitable vertical decanters, liquid organic extractants, and methods of operation are described in coassigned U.S. Pat. No. 4,014,786, which is incorporated by reference.

In the embodiment of the process in which a single-stage decanter is used, all of the liquid aqueous emulsion and at least a portion i.e. 90 to 100 vol. % and preferably all of the liquid organic extractant are mixed together with the water-particulate solids dispersion, and the mixture is introduced into the decanter. Optionally, a mixing valve or other suitable conventional in-line mixer may be used. The emulsion is usually completely broken up into its constituents before the mixture enters the decanter. Sufficient liquid organic extractant is mixed with the water-carbon dispersion containing any ash so as to separate the particulate carbon from the water and to form an upper dispersion of liquid organic extractant, particulate carbon, carry-over water, and gaseous impurities i.e. $H_2S$, COS, and $CO_2$ which floats on top of the clarified water phase containing a minor amount i.e. in PPM of carbon, ash, and gaseous impurities which settles to the bottom of the decanter by gravity. The total amount of liquid organic extractant that may be introduced into a one or two stage decanting process is in the range of about 10 to 200 times, such as 30 to 70 times the weight of the particulate carbon in the carbon-water dispersion. The pumpable liquid organic extractant-particulate carbon dispersion in the upper portion of the decanter has a solids content of about 0.5 to 9 wt.% and may contain about 0.5 to 10 wt.% of carry-over water.

In the operation of a continuous two-stage decanter, such as described in coassigned U.S. Pat. No. 4,014,786, a portion of the liquid organic extractant is simultaneously added in both stages. For example, in a given period of time, there is introduced into the first stage of the decanter a mixture comprising (a) from 0 to 100 wt.% (and preferably 100 wt. %) of the liquid aqueous emulsion that is produced during said period at a temperature in the range of about 80° to 140° F., (b) all of said carbon-water dispersion being introduced during said period at a temperature in the range of about 180° to 500° F., say about 250° to 350° F., and (c) an amount of the liquid organic extractant at a temperature in the range of about 80° to 250° F. which is sufficient to resolve said carbon-water dispersion. The pressure of streams (a), (b) and (c) are about the same and are in the range of about 10 to 70 Atm., say about 35 Atm. Simultaneously, the remainder, if any, (from 0 to 100 wt. %) and preferably 0 wt. % of the liquid aqueous emulsion produced during said period, in admixture with the remaining portion of said liquid organic extractant i.e. an amount which is sufficient to produce a pumpable liquid organic extractant-particulate carbon-water dispersion having a solids content in the range of about 0.5 to 9.0 wt.% are introduced into the second stage of said two-stage decanter. In the first stage of said process, the aqueous emulsion may be mixed with the water-carbon dispersion. The liquid organic extractant may be then added to this mixture. Alternatively, the carbon-water dispersion may be mixed with the liquid organic extractant, and the liquid aqueous emulsion may be then added to this mixture.

In another embodiment, all of the liquid aqueous emulsion that is produced during a specific period is mixed with all of the bottoms water leaving the decanter during the same period. The mixture of fluids is then introduced into a water-reclamation operation such as a water flash column, to be further described. For example, in a one or two-stage decanting operation a sufficient amount of the liquid organic extractant at a temperature in the range of about 80° to 250° F. is mixed with the carbon-water dispersion at a temperature in the range of about 180° to 500° F., say 250°–350° F., to resolve said carbon-water dispersion. A liquid dispersion comprising extractant-particulate carbon-water containing at least one gaseous impurity from the group $H_2S$, $NH_3$ and $CO_2$ separates from a bottoms water layer containing entrained particulate carbon and any ash, any water soluble liquid hydrocarbon, and at least one gaseous impurity from the group $H_2S$, $NH_3$, and $CO_2$. The extractant-carbon water dispersion at a temperature in the range of about 180° to 500° F., say 250°–350° F. is removed from the top of the decanter and mixed with a heavy liquid hydrocarbon. Then by separation, such as by a distillation operation, a pumpable bottoms dispersion of heavy liquid hydrocarbon and particulate carbon is separated from an overhead stream of vapor which is then cooled and condensed. Liquid organic extractant, liquid aqueous emulsion, and water separate out by gravity in a separating vessel. At least a portion of the liquid organic extractant plus any make-up liquid organic extractant is recycled to to the decanting operation. Also, all of the aqueous emulsion produced during the period at a temperature in the range of about 80° to 140° F. is mixed with all of the bottoms water layer leaving the decanting operation during the same period at a temperature of about 180° to 500° F., say 250° to 350° F., thereby breaking up the emulsion. The resulting mixture is then passed into a water flash column. The water from he bottom of the separation vessel is separately introduced into the water flash column. Reclaimed water is removed from the bottom of the flash column and then recycled to synthesis gas quenching and scrubbing zones.

The actual amount of first-stage liquid organic extractant to be mixed with the carbon-water dispersion for distribution by way of the lower horizontal radial nozzle in the decanter may be determined experimentally by shake tests. Thus, the liquid organic extractant is added to a sample of the carbon-water dispersion in increments with intermediate shaking until sufficient oil has been added to cause the carbon to separate rapidly and float on the surface of the clarified water. When the carbon appears dry and unagglomerated the amount of extractant is optimum. The amount of liquid organic extractant added in the first stage may range between about 1.5.–15 lbs. of extractant per lb. of carbon, or more likely in the range of about 1.5 to below 5.

The amount of second-stage liquid organic extractant that is simultaneously introduced into the vertical decanter by way of the upper horizontal radical nozzle is sufficient to produce a dispersion of liquid organic extractant and particulate carbon having a solids content in the range of about 0.5 to 9 wt.%. The ash settles to the bottom of the decanter. About 85 to 95 wt. % of the total amount of liquid organic extractant is introduced into the decanter in the second-stage.

The liquid organic extractant may be any pumpable organic liquid which is immiscible with water and for which the particulate carbon has a greater affinity for than it has for water. Preferably, the resulting carbon-liquid organic dispersion is lighter than water so that it will separate from and float on the separated clarified water. The carbon-extractant dispersion may be then removed at the top of the decanter while the clarified water may be removed through an outlet at the bottom.

Suitable liquid organic extractants that form dispersions with particulate carbon which are lighter than water include: (1) light liquid hydrocarbon fuels having an atmospheric boiling point in the range of about 100° to 750° F., density in degrees API in the range of over 20 to about 100, and a carbon number in the range of about 5 to 16; (2) a mixture of substantially water insoluble liquid organic by-products from an oxo or oxyl process; and (3) mixtures of types (1) and (2). Examples of type (1) liquid extractants include butanes, pentanes, hexanes, toluol, natural gasoline, gasoline, naphtha, gas oil, their mixtures and the like. Ingredients in the mixture comprising type (2) extractants include at least one alcohol, at least one ester and at least one constituent from the group consisting of aldehydes, ketones, ethers, acids, olefins, and saturated hydrocarbons.

The particulate solids in the water dispersion introduced into the decanter comprises mostly carbon and possibly some ash. The particulate carbon is in the form of carbon black or soot. The Oil Absorption No. of the carbon soot, as determined by ASTM Method D-281, is greater than 1 and usually varies from 2 to 4 cc of oil per gram of C. The diameter of the soot particles is less than about 70 millimicrons. The inorganic ash from the oil in these dispersions may comprise metals and the sulfides thereof selected from the group $N_i$, V, and Fe, and mixtures thereof. A minor amount of soluble impurities in the dispersion of water-particulate solids comprise in parts per million (PPM): ammonia 0 to 10,000; formate 0 to 10,000; sodium chloride 0 to 5,000; nickel 0 to 25; iron 0 to 150; sulfide 0 to 500; and cyanide 0 to 100.

The decanter is operated at a temperature in the range of about 180° to 500° F. and preferably above 250° F. The pressure in the decanter is basically set by the temperature. The pressure must be high enough to keep the liquid organic extractant in liquid phase. Thus, when the decanter bottoms outlet temperature is 300° F. and the liquid organic extractant is naphtha, the pressure in the decanter may be at least 300 psia. The total amount of liquid organic extractant used to resolve the carbon-water dispersion may be in the range of about 10 to 200 times, such as 30 to 70 times, the weight of the particulate carbon in the carbon-water dispersion. The dispersion of water and particulate solids is resolved in the decanter. A stream of water containing about 100 to 500 parts per million by weight of particulate carbon and about 20 to 60 wt.% of the ash separates out by gravity and leaves at the bottom of the decanter. Most of the other impurities in the dispersions of water-particulate solids that enter the decanter in the feed, as mentioned previously, are also included in this water stream that leaves from the bottom of the decanter. This dilute water dispersion leaves the decanter at a temperature in the range of about 180° to 500° F., say 250° to 350° F. and at a pressure of about 150 to 1000 psig, say about 250 to 500 psig. It may contain gaseous impurities selected from $H_2S$, COS, and $NH_3$.

The volume of the decanter is such as to provide a sufficient residence time for phase separation to occur. Thus, the residence time for the water phase and the liquid organic extractant phase in the decanter may be in the range of about 2 to 20 minutes and preferably about 6 to 15 minutes.

The dispersion of carbon-liquid extractant-water containing about 0.5 to 9 wt.% of particulate carbon and about 0.5 to 10 wt. % of carry-over water is removed from the top of the decanter. In a preferred embodiment the stream is mixed with a heavy liquid hydrocarbon fuel i.e. fuel oil, crude oil having a gravity in degrees API in the range of about −20 to 20. The mixture is then introduced into a distillation column. The amount of heavy liquid hydrocarbon fuel, as previously described, is kept to a minimum. This amount should be sufficient only to form a pumpable bottoms slurry with the particulate carbon that is separated from said carbon-extractant dispersion in said distillation column. The aforesaid pumpable bottoms slurry may have a carbon content of about 0.5 to 25 wt. percent and preferable 4 to 8 wt. percent. The slurry of carbon and heavy liquid hydrocarbon is removed from the bottom of the distillation column and sent to the gas generator as a portion of the feed. The overhead vapors from the distillation column are cooled to a temperature below the dew point of the liquid organic extractant, aqueous emulsion, and the water which condense, settle out, and are separated in a separation vessel. The liquid aqueous emulsion is produced in the separating tank due to emulsion producing impurities that enter the system along with the liquid organic extractant and the heavy liquid hydrocarbon fuel i.e. naphthenic acids. Any uncondensed acid-gases from the group $H_2S$, COS, $CO_2$, and mixtures thereof and hydrocarbon vapor if any are removed from the top of the separating tank. The temperature in the separating tank is in the range of about 80° to 150° F., and the pressure is in the range of about 0 to 50 psig.

The liquid aqueous emulsion comprises in wt.% water about 93 to 96, heavy liquid hydrocarbon about 0.05 to 0.5, napthenic acid about 0.002 to 0.20, asphaltene or scale about 0.002 to 0.20, and the remainder liquid organic extractant. The aqueous emulsion comprises about 0.5 to 10 wt.% of the overhead from the distillation column and if not disposed will upset the settling tank. The liquid organic extractant and the aqueous emulsion are separately removed and recycled to the decanter where they may be introduced into either a one-stage, or a two-stage decanter, as previously described. Water, containing at least one acid-gas from the following group $CO_2$, $H_2S$ and COS, is removed from the bottom of the separation tank and is introduced on to the top tray of a flash column.

In one embodiment the hydrocarbonaceous feed to the gas generator comprises liquid hydrocarbon distillate substantially comprising about $C_3$ to about $C_{10}$ hydrocarbons and a dispersion of particulate carbon and said liquid hydrocarbon distillate. In this case the liquid hydrocarbon distillate is also employed as the liquid organic extractant in the decanter. The distillation column may be thereby eliminated, and the overhead stream of carbon-extractant dispersion from the decanter may be then introduced, with or without heat exchange, into the gas generator as a portion of the feedstock.

The overhead stream from the flash column is cooled below the dew point of the normally liquid constituents. The cooled stream is then introduced preferably, into the same separation vessel as that used to separate the cooled and condensed overhead from the distillation column, By means of an internal pipe, the cooled stream is preferably discharged below the water level at the bottom of the separation vessel. Uncondensed gaseous impurities from the group $H_2S$, $NH_3$, $CO_2$, hydrocarbon vapors, and mixtures thereof, if any may be removed from the top of the separation vessel. Water and liquid organic extractant settle out in the separation vessel in the manner previously described.

At least a portion of the water from the bottom of the separation vessel is introduced on to a tray in the flash column i.e., preferably the top tray. Optionally, a portion of the water from the separation vessel is introduced in liquid or vapor phase, into the gas generator and serves as a portion of the temperature moderator. Any liquid organic extractant separated in the separation vessel may be introduced into the decanter or optionally fed to the gas generator. The uncondensed gases selected from the group $H_2S$, $CO_2$, $NH_3$, and any hydrocarbon vapors which are removed near the top of the separation vessel may be disposed of, for example in a Claus operation or sent to flare. The water flash column comprises: an upright column; at least one, such as 1–5 and preferably one horizontal stripping plate spaced within said column for holding water to be stripped, each plate containing dispersive means for dispersing steam through the water on said stripping plate, and over-flow and down-flow means for continuously discharging the steam stripped water from plate to plate and finally into a return water-side chamber below; a vertical weir separating the column at the bottom into a first or receiving-side chamber filled with water, and said second or return water-side chamber for holding the water that overflows said vertical weir from said first chamber and the steam stripped water that overflows the stripping plate in a single plate column or the bottom stripping plate in a multiplate column whereby the water is discharged below the level of the liquid in said second chamber; inlet means for flashing at least one stream of water containing particulate solids into the space below the bottom stripping plate and above said first or second chambers, and inlet means for introducing at least one stream of water containing substantially no solids on to at least one stripping plate, and preferably the top stripping plate; outlet means for removing from the column an overhead stream of vapors comprising at least one member of the group $H_2O$, $CO_2$, $H_2S$, $NH_3$, and hydrocarbons; outlet means at the bottom of said tower for removing from said second chamber a stream of reclaimed water of substantially reduced solids content; and outlet means for removing from said first chamber a stream of waste water containing particulate solids.

The top horizontal stripping plate in the flash-tower is preferably spaced from about ¼ to ¾ of the height of the column. Conventional crossflow plates, including bubble-cap sieve, or valve equipped with at least one downcomer may be employed. Gas dispersers include perforations in the plates or bubble caps. Perforated plates include sieve plates or valve plates. For example, sieve-plate dispersers contain drilled or punched holes ⅛ to ¼ inch diameter. Liquid is prevented from flowing down through the perforation by the upward flowing action of the vapor. Thus, the pressure in the tower below a stripping plate is about 1 to 3 psig greater than the pressure in the tower above the stripping plate.

With bell caps and tunnel caps, the vapor flows up through a center riser in the plate, reverses flow under the cap, passes downward through the annulus between the riser cap, and finally passes through the liquid on the plate through a series of peripheral openings of slots in the lower side of the cap.

The downcomer zones generally occupy about 5 to 30 percent of the total cross section, such as 5 to 15% for segmental downcomers, as shown in the drawing. Included is a vertical weir which extends upwards from the stripping plate. Steam stripped water continuously builds-up on the plate and overflows said weir. Additional information on stripping plate design may be obtained from Chemical Engineers Handbook, Robert H. Perry and Cecil H. Chilton, Fifth Edition 1973 McGraw-Hill Book Co. Page 18-3 to 18-19.

The overhead stream of vapors leaving the water-flash column at a temperature in the range of about 212° to 275° F. is cooled below the dew point of the normally liquid constituents contained therein. Water and liquid hydrocarbons such as liquid organic extractant are condensed out and are then separated from the uncondensed gases in a separation vessel. Advantageously, in the preferred embodiment, the separation vessel is the same vessel that is used to receive the cooled stream of water, liquid organic extractant, and uncondensed gases from the distillation column. The hydrocarbon material enters into the flash column along with the water streams. Any uncondensed vapors from the group $H_2S$, $CO_2$, $NH_3$, hydrocarbons, and mixtures thereof are removed from the top of the separation vessel. Clear water is drawn off from the bottom of the separation vessel and is recycled to the water flash column where it is introduced on to a stripping plate at a temperature in the range of about 80° to 175° F. In a multiplate flash column, this water stream is preferably introduced on to the top plate.

In the operation of the flash column water streams containing substantially no solids i.e. solids-free are introduced on to a stripping plate, i.e., preferably the top plate. Solids containing water streams and blow-down water streams from a gas cooler, if any, are flashed into the column to produce steam in the space below the bottom stripping plate and above the two chambers in the bottom of the column. Thus, the dilute dispersion of water and particulate solids from the bottom of the decanter, and at substantially the same conditions of temperature and pressure less ordinary losses in the line, is passed through a pressure reducing means such as an expansion valve. The pressure is dropped to about 0 to 30 psig, and for example up to 10 wt.%, say about 1-7 wt.%, is flashed into steam. The stream is usually introduced into the flash column below the stripping plate at the bottom of the column and in the space above the receiving side chamber. The steam passes up through the gas dispersers in the perforated plate, as previously described. The unvaporized portion of said stream and the dispersed solids fall into the receiving side chamber. If desired, a portion of the blow-down water stream from the gas cooler following the gas generator may be similarly passed through a pressure reducing means, such as an expansion valve, and reduced to a pressure in the range of about 0 to 30 psig prior to being introduced into the flash column. A portion of the water in this stream is flashed into steam i.e. up to 25 wt.%, say 5 to 15 wt. %. This stream contains practically no particles and may be introduced into the flash column below the bottom stripping plate and in the space preferably, above the return water side chamber. Optionally, the blow-down water stream may be flashed into the space above the receiving side chamber. The solids-free water from the separator following the distillation column is introduced on to a stripping plate in the flash column. Preferably, this solids-free water stream is introduced in the space at the upper part of the flash column above the top tray. Fresh water make-up may be introduced into the return water side chamber of the flash column.

Reclaimed water containing from about 0 to 0.05 wt. % particulate solids may be withdrawn from the return water side chamber at a temperature in the range of about 212° to 275° F. and a pressure in the range of about 0 to 30 psig and recycled to the scrubbing zone in the first train, the scrubbing and quench zones in the second train, or to both trains. Optionally, a portion of this water may be recycled to the gas generator. A stream of waste water at substantially the same temperature and pressure as the reclaimed water may be removed from the receiving chamber and discharged from the system. The waste water stream may contain about 0 to 0.2 wt. % particulate solids, and the following soluble impurities in PPM: ammonia 0 to 10,000; formate 0 to 10,000; sodium chloride 0 to 5,000; sulfide 0 to 500; nickel 0 to 25; iron 0 to 150, and cyanide 0 to 100.

In one further embodiment, the liquid aqueous emulsion is broken by heating say at a temperature greater than 140° F. and separated into a water layer and a liquid hydrocarbon layer. The water layer is introduced into the flash column for reclamation of water, as previously described. The liquid hydrocarbon layer is mixed with the overhead carbon-extractant-water dispersion from one or two-step decanters and introduced into the distillation column.

DESCRIPTION OF THE DRAWING

A more complete understanding of the invention may be had by reference to the accompanying drawing. FIG. 1 is a fragmental schematic representation of a vertical cylindrically shaped flash column 1 taken around stripping plate 2. Flash column 1 may be used in somewhat the same manner as that described for flash column 70 as shown in FIG. 2. In FIG. 1, small diameter holes 3 are drilled in plate 2 and the rate of flow of vapors 4 up through the holes in plate 2 prevents the water on plate 2 from passing down through the holes. By this means the vaporizable impurities may be stripped from the water contained on plate 2. Horizontal plate 2 is substantially round except for one side that has attached a vertical chordal weir 5 that discharges into segmental or round downcomer 6. A solids-containing water stream in line 7 is passed through pressure reducing valve 8, line 9, inlet 10 and is flashed into column 1. Substantially solids-free impure water is passed through line 11 and inlet 12 on to plate 2. Stripped water overflows weir 5 and flows down through downcomer 6 to the plate below or if there is no plate below to the return-water side chamber (not shown in FIG. 1).

With reference to FIG. 2, an embodiment of the invention will be described first wherein all of the aqueous emulsion 14 in separation tank 15 is introduced into the dispersion of water and particulate solids going to two-stage vertical decanter 16 upstream of the first stage liquid organic extractant addition. In such case, valve 17 is open and valves 18 and 19 are closed. The dispersion of water and particulate carbon containing some ash in line 20 is mixed in line 21 with aqueous emulsion 14 which is pumped by pump 22 through lines 23-27. This mixture is mixed in line 28 with the first-stage liquid organic extractant from separation tank 15, which passes through lines 29, 30, 32 and 33. The mixture passes through flanged inlet 34, up through an annular passage between outer pipe 35 and concentric inner pipe 36 and passes out into the symmetrical decanter by way of lower horizontal radial nozzle 37. The particulate carbon in the water dispersion is rendered hydrophobic by contact with the liquid organic extractant and floats to surface 38 of the water phase which is in the bottom section of the decanter. The water phase drops by gravity to the bottom of the decanter along with part of the non carbonaceous solids i.e. ash. The particulate carbon freed in the decanter picks up some of the constituents of the emulsion i.e. emulsifiers such as naphthenic acid, heavy oil, and liquid organic extractant. Simultaneously, second-stage liquid organic extractant from lines 29, 30, 32, 39 and 40 is passed through flanged inlet 41 of inside pipe 36, and out through the upper horizontal radial nozzle 42 which is positioned adjacent to interfacial level 38. Sufficient second-stage liquid organic extractant is introduced by way of horizontal nozzle 42 to pick up the particulate carbon at the interface and to produce a pumpable dispersion comprising liquid organic extractant, particulate carbon, water, gaseous impurities and which has a solids content in the range of about 0.5 to 9 wt. %. This dispersion fills the remainder of decanter 16 and leaves through line 43 near the top. The dilute bottoms water stream containing about 0.01 to 0.05 wt.% particulate carbon and a smaller amount of ash leaves through line 44 near the bottom of the decanter.

A dispersion comprising liquid organic extractant, particulate carbon, carry-over water, and gaseous impurities is removed through line 43 and mixed in line 50 with heavy liquid hydrocarbon fuel oil from line 51. The mixture is heated in heat exchanger 52, and passed through line 53 into distillation column 54 equipped with reboiler 66. A slurry of heavy liquid hydrocarbon and particulate carbon is removed through line 55 at the bottom of column 54 and may be introduced into a partial oxidation gas generator (not shown) as a portion of the fuel. The hot raw gas stream from the partial oxidation gas generator (not shown) contains entrained particulate solids i.e. carbon and ash. These solids are removed from the process gas stream in either a gas quenching or scrubbing zone, (not shown), or both by contact with water. The carbon-water dispersion which is introduced into the system through line 20 is thereby produced.

The hot vapors leaving distillation column 54 by way of line 56 are cooled below the liquefaction temperatures of the organic extractant, aqueous emulsion and water in heat exchanger 58. The mixture of uncondensed gases, liquid extractant, aqueous emulsion and water is passed through line 59 into separation vessel 15. By gravity, liquid organic extractant 60, emulsion 14 and water 13 separate out in vessel 15. Any uncondensed gases and hydrocarbon vapors selected from the group $H_2S$, $NH_3$, $CO_2$, hydrocarbon vapor, and mixtures thereof are removed through line 61. Optionally, this stream may be sent to a Claus operation (not shown) for recovery of sulfur. Any required make-up liquid organic extractant is introduced into the system through line 62, valve 63, and line 64. A portion of the liquid extractant in line 30 may be passed through line 31 into distillation column 54 as reflux. If desired, the liquid organic extractant in line 30 may be preheated by indirect heat exchange with the overhead from distillation column 54 in line 56. An improved water flash column 70 for reducing the ash content in the water streams and removing gaseous impurities is used in the subject process. In this flash column stripping plate 71 is substantially round except for one chordal side and is equipped with a plurality of vapor risers 72 and bellcaps 73. Stream stripped water 74 on plate 71 overflows vertical chordal weir 75 attached to the end of the otherwise round plate 71. The stripped water falls into segmental downcomer 76 and discharges beneath the water level 77 in return water side chamber 78. Vertical weir 79 divides the bottom of flash column 70 into return water side chamber 78 and receiving side chamber 80. That portion of the water which is not flashed builds up in receiving side chamber 80 until water level 81 is reached when it overflows weir 79. Deflection shield 82 prevents the unflashed water from dripping into chamber 78. Make-up water may be added through line 83.

In operation, the stream of water, dissolved gases i.e. $H_2S$, $NH_3$, $CO_2$, and particulate solids i.e. particulate carbon and ash separated in decanter 16 is introduced into flash column 70, below stripping plate 71 by way of line 44, pressure reducing valve 84, and lines 85-86. If desired, a stream of blow-down water produced periodically in a gas cooler following the gas generator (not shown) is also introduced into flash column 70 below stripping plate 71 by way of line 89, pressure reducing valve 90, line 91, and pipe 92. A portion of stream 86 is flashed into steam and the remainder falls into receiving side chamber 80. Similarly, a portion of stream 89 is flashed into steam and the remainder falls into chamber 78.

Water 13 in separation vessel 15 containing uncondensed gases i.e. $H_2S$, $NH_3$, $CO_2$ is pumped by means of pump 97 on to stripping plate 71 in flash column 70 by way of lines 98 and 99. Steam passes up through riser 72 and is deflected by bell-cap 73 through the water contained on stripper plate 71. The vapors leaving column 70 through line 110 are cooled below the dew point of water in cooler 111 and pass through line 112 into separation vessel 15. By means of internal pipe 113, this stream is discharged below the surface of water 13.

The purified reclaimed water from the bottom of return water side chamber 78 in water flash column 70 is pumped by means of pump 114 to gas scrubbing or quenching operations, or both. For example, a portion of the reclaimed water may be pumped through lines 115-117 into a gas scrubbing zone (not shown) following a gas cooler for cooling the hot raw effluent gas stream from a partial oxidation gas generator. Another portion of the reclaimed water in line 116 may be passed through line 120 into a separate gas scrubbing and gas quenching operation (not shown). Thus the hot raw effluent gas stream from the gas generator may be first quenched in reclaimed water in a quench tank and then scrubbed with reclaimed water in a scrubbing zone. A portion of the reclaimed water from return water chamber 78, for example, may be serially introduced first into the scrubbing zone and then into the quench tank.

Waste water containing solids is removed from the receiving side chamber 80 and is discharged from the system through line 121.

Other schemes for pumping emulsion 14 from separation vessel tank 15 into the decanting operation may be accomplished in the following manner: (1) With valves 17 and 18 closed and valve 19 open, all of the emulsion 14 in separation 15 is mixed with the second-stage liquid organic extractant. In such case, the emulsion in line 23 is pumped through lines 23, 24, 125, 126 and mixed in line 40 with the second-stage liquid organic extractant from line 39. All of the other streams are the same as described previously in the original embodiment. (2) With valves 17 and 19 open and valve 18 closed, a portion of emulsion 14 in separator 15 is introduced into the carbon-water dispersion from line 20 and the remainder is introduced into second-stage liquid-organic extractant from line 40. All of other streams are the same as discussed previously in the original embodiment.

In another embodiment, emulsion 14 from separator 15 is mixed in line 86 with the bottoms water stream leaving decanter 16. The mixture is then introduced into flash column 70. In such case, valves 17 and 19 are closed and valve 18 is opened. The aqueous emulsion is pumped through lines 23, 24, 25, 127, 128 and mixed in line 86 with the hot bottoms water from line 44, pressure reducing valve 84, and line 85. By this means the emulsion is broken-up. The mixture is flashed into flash comumn 70 below plate 71. All of the other streams are the same as discussed previously in the original embodiment.

FIG. 3 pertains to an embodiment of the process wherein all of aqueous emulsion 14 is removed from separation vessel 15, broken-up by heating, and the constituents separated. The water phase is recycled to the flash column 70 and the liquid hydrocarbon phase is mixed with the overhead dispersion from the decanter and heavy liquid hydrocarbon. This mixture is then introduced into the distillation zone. Optionally, the liquid hydrocarbon phase is introduced into the gas generator. Thus, as shown in FIG. 3, aqueous emulsion 14 in separation vessel 15 is pumped by pump 22 through lines 23-24 into heater 130. There the emulsion is heated and broken-up into its constituents which pass through line 131 into separation vessel 132. By gravity, the water phase 133 accumulates at the bottom of the tank. The liquid organic constituents of the emulsion i.e. extractant, naphthenic acid, heavy oil form a liquid hydrocarbon phase 134 which floats on the water layer. Gases selected from the group $H_2S$, $NH_3$, and $CO_2$ and optionally hydrocarbon vapors are removed through line 135 and exported. For example, gas streams 61, and 135 may be sent to a Claus unit (not shown) for conversion into sulfur. Water 133 is pumped by pump 136 through line 137, 138, and mixed in line 100 with water 13 from separation vessel 15 which is pumped into line 100 by pump 97 by way of lines 98 and 99. The water mixture in line 100 is introduced into flash column 70 above plate 71. The overhead from flash column 70 in line 110 is cooled in cooler 111 below the dew point of the normally liquid constituents. The cooled stream in line 112 is introduced into separation vessel 15. By means of internal pipe 113, the cold stream is discharged below the water level at the bottom of vessel 15. Preferably all or a portion of liquid organic constituents 134 are passed through line 139, 140, valve 141, and line 142 and mixed in line 50 with the liquid organic extractant-particulate carbon-water dispersion from line 43 and the heavy liquid hydrocarbon from line 51. Optionally, all or a portion of the liquid organic constituents in line 139 may be passed through line 143, valve 144, and line 145 into the partial oxidation gas generator (not shown) as a portion of the feed. After being preheated in heater 52, the mixture from line 50 is passed through line 53 into distillation column 54. The bottoms stream from the distillation column comprising unvaporized liquid organic constituents and heavy liquid hydrocarbons in 55 may be consumed in the partial oxidation gas generator (not shown) as a portion of the feed. The rest of the streams and equipment in FIG. 3 have the same reference numbers and the same function as corresponding items in FIG. 2, as previously described.

EXAMPLES

The following examples illustrate embodiments of the process of this invention as related to FIGS. 2 and 3 of the drawing. The Examples pertain to a partial oxidation process for the simultaneous production of two clean streams of gas in two separate trains, one gas stream being shifted and the other being unshifted. Both gas streams are cleaned by contact with reclaimed water produced in the process. While several modes of operation are illustrated, the examples should not be construed as limiting the scope of the invention. The process is continuous and the flow rates are specified on an hourly basis for all streams of materials.

EXAMPLE I 162,356 lbs. of a vacuum resid having a gravity of 2.0 degrees API, an Ultimate Analysis in weight percent as follows: C 83.45, H 10.10, N 0.35, S 5.50, and 0.60, an ash content of 0.3 weight % max. comprising in parts per million by weight of the elements vanadium 300 and nickel 50, and a salt content of 10.0 max. pounds per thousand barrels, are mixed with 2765 pounds of recycled unreacted particulate carbon recovered downstream in the process to produce a pumpable dispersion of particulate carbon and petroleum oil. The oil-carbon dispersion is pumped through a heater where it is brought up to a temperature of 540° F. and a pressure of 1165 psig. The dispersion is then mixed with a stream of 64,942 lbs. of steam at a temperature of 574° F. and a pressure of 1165 psig. The oil-carbon-steam mixture is passed through the annulus of an annulus-type burner which is located in the upper end of a conventional vertical refractory lined free-flow noncatalytic unpacked synthesis gas generator.

Simultaneously, a stream of 171,032 lbs. of substantially pure oxygen i.e. 99.5 mole % $O_2$ is passed through the center passage of the burner. The two streams impinge, mix and the partial oxidation and other related reactions then take place in the reaction zone of the gas generator.

A stream of 8.69 million standard cubic feet (SCF measured at 60° F., 1417 psia) of raw gas leave the reaction zone of the gas generator at a temperature of 2596° F. and a pressure of 1050 psig. The composition of the raw gas at the exit from reaction zone is shown in column 1 of Table I. About 2765 lbs. of unreacted carbon plus ash are entrained in the raw synthesis gas.

The raw effluent gas stream leaving the reaction zone is split into two streams; 5.65 million SCF of raw gas are processed in a first train where no water-gas shift reaction i.e. no shifting takes place; and the remainder, 3.04 million SCF of raw gas are simultaneously processed in the second train where shifting takes place.

The composition of the raw gas stream leaving the gas cooler in the first train is shown in column 2 of Table I. After substantially all of the entrained carbon and ash are scrubbed from the raw gas stream in a gas scrubbing zone and the gas stream is cooled below the dew point to condense out substantially all of the water, the composition of the unshifted product gas stream is shown in column 3 of Table I.

About 21,540 gallons per hr. (GPH) of a water dispersion containing about 1 wt. % of particulate solids is removed from the gas scrubbing zone in the first train at a temperature of 310° F. and a pressure of 860 psig. The solids content of this water stream is reduced and the water is reclaimed for recycle to the gas scrubbing zone in the manner to be further described.

Returning now to the second split stream of raw synthesis gas which comprises the remainder of the stream of raw gas stream leaving the reaction zone. By passing all of the raw gas from the reaction zone through a passage of reduced diameter, the rate of flow may be accelerated and the velocity of the solid particles i.e. carbon and ash entrained in the gas stream may be increased. Accordingly, a large proportion of the solid particles may be entrained in the second split stream of raw gas which is directly quenched in the water contained in a quench tank located below the gas generator. The actual split of the gas stream between the first and second trains may be controlled by back pressure valves in each line.

The stream of 7.07 million SCF of raw gas in the second train is saturated with water as the result of being quenched in a quench tank followed by being scrubbed with water in a gas scrubber. This gas stream has the composition shown in column 4 of Table I. After being shifted in a catalytic water-gas shift converter, the process gas stream has the composition shown in column 5 of Table I. After being cooled by indirect heat exchange below the dew point, the shifted product gas stream has the composition shown in column 6 of Table I. This gas stream may be purified in a gas purification zone not shown to produce clean purified $H_2$-rich gas. About 11,590 GPH of a water dispersion containing about 1 wt. % of particulate solids is removed from quench tank in the second train at a temperature of 480° F., a pressure of 900 psig.

With respect to FIG. 2, the water-particulate solids dispersions produced in both trains are combined in line 20 and are resolved in either a one or two-stage decanter, in the manner previously described. First however, 2,960 lbs. per hr. of aqueous emulsion produced downstream in the process in separator 15, and having a temperature of 100° F., are mixed in line 21 with the water-particulate solids dispersion from line 20. Then 16,500 lbs. per hr. of first-stage naphtha from line 33 having a temperature of 200° F. are mixed with the mixture of streams in line 28. The aqueous emulsion is resolved. Simultaneously, 94,100 lbs. per hr. of second-stage naphtha from line 40, having a temperature of 200° F. are introduced into the decanter by way of upper horizontal radial nozzle 42. The temperature in decanter 16 is 300° F. and the pressure is about 300 psig. 19,300 GPH of an overhead dispersion comprising liquid organic extractant, particulate carbon, and water are removed from decanter 16 and mixed with 55,300 lbs. per hr. of heavy fuel oil from line 51. This mixture is then introduced into a distillation operation. 58,080 lbs. per hr. of a slurry comprising particulate carbon, heavy fuel oil and emulsifying agents, are removed from the bottom of the distillation column and introduced into the partial oxidation gas generator. The overhead from the distillation column is then cooled to below the liquefaction temperature of the liquid organic extractant and the aqueous emulsion that forms i.e. to 100° F. by indirect heat exchange with cooling water. About 19,000 GPH of naphtha and 2960 lbs. per hr. of aqueous emulsion having the following composition in wt. % water 94.4 naphtha 5.2 heavy hydrocarbon 0.2, and naphthenic acid 0.2, and 10900 lbs. per hr. of water separate out by gravity in separator 15. A gas mixture comprising in mole %: $H_2S$ 8.8, $CO_2$ 58.3, $H_2$ 19.2 and CO 13.7 is removed from the top of separator 15 and is sent to a Claus unit for sulfur recovery.

About 32,520 GPH of a dilute water dispersion containing about 0.03 wt. % of particulate solids is removed at the bottom of the decanter at a temperature of 300° F. and a pressure of 300 psig. This stream is passed through line 44 and valve 84 where the pressure is dropped to 20 psig and at least a portion of this stream is converted into steam. The stream then passes through line 85 and 86 and enters flash column 70 below stripping plate 71. Periodically, blowdown water from the gas cooler in the first train at a temperature of 564° F. and a pressure of 1150 psig is passed through line 89 and through valve 90 where the pressure is reduced to 20 psig. At least a portion of this stream is converted into steam which enters flash column 70 through line 91, pipe 92, and discharges into the space below stripping plate 71. Water 13 in separation vessel 15 is introduced on to stripping plate 71 in column 70.

The overhead from flash column 70 is cooled below the dew point. Water separates out in separator 15. 1310 GPH of this water at a temperature of 100° F. and a pressure of 15 psig is pumped through lines 98 and 99 on to stripping plate 71 of flash column 70.

29,300 GPH of reclaimed water at a temperature of 259° F. and a pressure of 20 psig is withdrawn from return water side chamber 78 of flash column 70 by way of line 115 and recycled to gas scrubbing and quenching operations. 3600 GPH of waste water in receiving side chamber 80 is withdrawn through line 121 and is discharged from the system.

EXAMPLE II

With respect to FIG. 3, 2760 lbs./hr. of water is separated in separator 132 by heating and breaking up 2960 lbs./hr. of aqueous emulsion 14. The water is pumped on to stripping tray 71 of flash column 70. While this reduces the load on the decanting and distillation operations, it requires the addition of heater 130 to break-up the emulsion. About 325 lbs. per hr. of liquid organic constituent in line 139 are mixed with the overhead from the decanter. The rest of the streams are substantially the same as that in FIG. 2.

TABLE I

| | GAS COMPOSITON-MOLE % | | | | | |
|---|---|---|---|---|---|---|
| Column No. | 1 | 2 | 3 | 4 | 5 | 6 |
| COMPOSITION | | | | | | |
| CO | 44.56 | 44.56 | 49.25 | 19.16 | 0.80 | 1.39 |
| $H_2$ | 39.87 | 39.87 | 44.06 | 17.14 | 35.51 | 61.96 |
| $CO_2$ | 4.27 | 4.27 | 4.72 | 1.83 | 20.23 | 35.31 |
| $H_2O$ | 9.52 | 9.52 | — | 61.10 | 42.69 | — |
| $CH_4$ | 0.36 | 0.36 | 0.40 | 0.15 | 0.16 | 0.27 |
| $A_r$ | 0.12 | 0.12 | 0.13 | 0.05 | 0.05 | 0.09 |
| $N_2$ | 0.09 | 0.09 | 0.10 | 0.04 | 0.04 | 0.07 |
| $H_2S$ | 1.15 | 1.15 | 1.27 | 0.50 | 0.52 | 0.91 |
| COS | 0.06 | 0.06 | 0.07 | 0.03 | — | — |

The process of the invention has been described generally and by examples with reference to materials of particular compositions for purposes of clarity and illustration only. It will be apparent to those skilled in the art from the foregoing that various modifications of the process and materials disclosed herein can be made without departure from the spirit of the invention.

We claim:

1. In a partial oxidation process for producing gaseous mixtures comprising $H_2$, $CO$, $H_2O$, entrained particulate carbon and at least one material from the group $CO_2$, $H_2S$, $COS$, $CH_4$, $N_2$, $A_r$, and ash by the partial oxidation of a hydrocarbonaceous feed with a free-oxygen containing gas, optionally with a temperature moderator, in a free-flow noncatalytic gas generator at a temperature in the range of about 1300° to 3000° F. and a pressure in the range of about 1 to 250 atm., cooling the effluent gas stream from said reaction zone and contacting said gas stream with water in gas quenching or cleaning operations, or both thereby removing said entrained particulate carbon and any ash and producing a clean gas stream and a carbon-water dispersion containing any ash, the improvement comprising: (1) mixing a liquid organic extractant and a liquid aqueous emulsion from (5) with said carbon-water dispersion, and breaking-up said emulsion; separating in a decanting operation a liquid dispersion comprising extractant-particulate carbon-water containing at least one gaseous impurity from the group $H_2S$, $NH_3$, and $CO_2$, from a bottoms water layer containing entrained particulate carbon and ash and a least one gaseous impurity from the group $H_2S$, $NH_3$, and $CO_2$; (2) mixing the extractant-carbon-water dispersion from (1) with a heavy liquid hydrocarbon; (3) heating the mixture from (2) above the vaporization temperature of water and said liquid extractant but below the boiling point of said heavy liquid hydrocarbon in a distillation zone, cooling the overhead vapor from said distillation zone to condense out and to separate in a separation vessel an upper layer of liquid organic extractant, an intermediate liquid layer of aqueous emulsion, and a lower layer of water from an overhead stream of uncondensed gaseous impurities if present; (4) removing a dispersion of heavy liquid hydrocarbon and particulate carbon from the bottom of said distillation zone and introducing same into said gas generator as a portion of the feed; (5) removing at least a portion of said liquid organic extractant and said liquid aqueous emulsion from said separation vessel and recycling same to said decanting operation in (1); and (6) reclaiming the water separated in the decanting operation in (1) and the water separated in the separation vessel in (3) by means of a flash column comprising at least one horizontal stripping plate and first and second chambers at the bottom of said flash-chamber.

2. The process of claim 1 provided with the additional steps of introducing at reduced pressure the bottoms water from the decanting operation in step (1) below the bottom horizontal stripping plate in said flash column; vaporizing a portion of said bottoms water and passing the vapors through water contained on said horizontal stripping plate to produce stripped water; collecting the unvaporized portion of said bottoms water in said first chamber at the bottom of said flash column; collecting said stripped water and the overflow from said first-chamber in said second chamber at the bottom of said flash-column; removing waste water containing ash from said first chamber and discharging same from the system; removing reclaimed water from said second chamber and recycling same to said gas quenching or cleaning operations or both; cooling and condensing the overhead vapors from said flash column and separating uncondensed gaseous impurities from the condensate in the separation vessel in step (3); and recycling the water from said separation vessel to said flash column.

3. The process of claim 1 provided with the step of recycling a portion of said liquid organic extractant from said separation vessel to said distillation zone.

4. The process of claim 1 wherein the overhead stream of gaseous impurities from said separation vessel is introduced into a Claus process for producing sulfur.

5. The process of claim 2 wherein blow-down water from a gas cooler is simultaneously flashed below the stripping plate in said flash column.

6. The process of claim 1 provided in (1) with the steps of mixing all of said aqueous emulsion and a portion of said liquid organic extractant from said separation vessel in (3) with said carbon-water dispersion and introducing the mixture into the first stage of a two stage decanting operation and simultaneously introducing the remainder of said liquid organic extractant into the second-stage of said decanting operation.

7. The process of claim 1 provided in (1) with the steps of mixing a portion of said liquid organic extractant from the separation vessel in (3) with said carbon-water dispersion and introducing the mixture into the first-stage of a two stage decanting operation, and simultaneously passing the remainder of said liquid organic extractant in admixture with all of said aqueous emulsion from said separation vessel into the second-stage of said decanting operation.

8. The process of claim 1 provided in (1) with the steps of mixing a portion of said aqueous emulsion and a portion of said liquid organic extractant from the separation vessel in (3) with said carbon-water dispersion and introducing the mixture into the first-stage of a two-stage decanting operation, and simultaneously introducing the remaining portions of said aqueous emulsion and said liquid organic extractant into the second stage of said decanting operation.

9. The process of claim 2 wherein the bottoms water stream containing entrained solids from the decanting operation in (1) at a temperature in the range of about 180° to 500° F. and a pressure in the range of about 150 to 1000 psig is passed through a pressure reducing means and reduced to a pressure in the range of about 0 to 30 psig prior to being introduced into said flash column below said stripping plate, vaporizing a portion of said water; the pressure in said flash column below said stripping plate is about 1 to 3 psig greater than the pressure in the column above the stripping plate; the stream of overhead vapors removed from the flash column is at a temperature in the range of about 212 to 275° F.; the water recycled to the flash column is introduced on to a stripping plate at a temperature in the range of about 80 to 175° F.; and said waste water from said first chamber, and said reclaimed water from said second chamber are removed at a temperature in the range of about 212 to 275° F.

10. The process of claim 2 wherein the effluent gas stream from said reaction zone is cooled in a gas cooler, and blow-down water leaves said gas cooler at a temperature in the range of about 300 to 600° F. and is passed through a pressure reducing means and reduced to a pressure in the range of about 0 to 30 psig prior to being introduced into said flash column below a stripping plate, thereby vaporizing a portion of said water.

11. In a partial oxidation process for producing gaseous mixtures comprising $H_2$, $CO$, $H_2O$, entrained particulate carbon and at least one material from the group $CO_2$, $H_2S$, COS, $CH_4$, $N_2$, $A_r$, and ash by the partial oxidation of hydrocarbonaceous feed with a free-oxygen containing gas, optionally with a temperature moderator, in a free-flow non-catalytic gas generator at a temperature in the range of about 1300° to 3000° F. and a pressure in the range of about 1 to 250 atm., cooling the effluent gas stream from said reaction zone and contacting said gas stream with water in gas quenching or cleaning operations, or both thereby removing said entrained particulate carbon and any ash and producing a clean gas stream and a carbon-water dispersion containing any ash, the improvement comprising:

(1) breaking-up a liquid aqueous emulsion produced subsequently in (5) by introducing into the first stage of a two-stage decanting operation a mixture comprising (a) from 0 to 100 wt. % of said liquid aqueous emulsion, (b) all of said carbon-water dispersion, and (c) a first portion of liquid organic extractant in an amount which is sufficient to resolve said carbon-water dispersion; and simultaneously introducing into the second stage of said decanting opertion the remainder if any, of said liquid aqueous emulsion in admixture with a second portion of said liquid organic extractant in an amount sufficient to produce a pumpable liquid organic extractant-particulate carbon-water dispersion having a solids content in the range of about 0.5 to 9.0 wt. %; separating a liquid dispersion comprising extractant-particulate carbon—water containing at least one gaseous impurity from the group $H_2S$, $NH_3$, and $CO_2$, from a bottoms water layer containing entrained particulate carbon and any ash and at least one gaseous impurity from the group $H_2S$, $NH_3$, and $CO_2$;

(2) mixing the extractant-carbon-water dispersion from (1) with a heavy liquid hydrocarbon;

(3) heating the mixture from (2) above the vaporization temperature of water and said liquid extractant but below the boiling point of said heavy liquid hydrocarbon in a distillation zone, cooling the overhead vapor from said distillation zone to condense out and to separate in a separation vessel an upper layer of liquid organic extractant, an intermediate liquid layer of aqueous emulsion, and a lower layer of water from an overhead stream of uncondesnsed gaseous impurities;

(4) removing a dispersion of heavy liquid hydrocarbon and particulate carbon from the bottom of said distillation zone and introducing same into said gas generator as a portion of the feed; (5) removing at least a portion of said liquid organic extractant and said liquid aqueous emulsion from said first separation zone and recycling same to said decanting operation in (1); and reclaiming the water separated in the decanting operation in (1) and the water separated in the separation vessel in (3) by means of a flash column comprising at least one horizontal stripping plate and first and second chambers at the bottom of said flash-chamber.

12. The process of claim 11 in which the amount of said liquid organic extractant in step (1) (c) is in the range of about 1.5—15 lbs. of extractant per lb. of carbon.

13. The process of claim 11 in which said hydrocarbonaceous fuel is a liquid hydrocarbon selected from the group consisting of liquefied petroleum gas, petroleum distillates and residua, gasoline, naphtha, kerosine, crude petroleum, asphalt, gas oil, residual oil, tar-sand oil and shale oil, coal derived oil, aromatic hydrocarbons (such as benzene, toluene, xylene fractions), coal tar, cycle gas oil from fluid-catalytic-cracking operations, furfural extract of coker gas oil, and mixtures thereof.

14. The process of claim 11 in which said hydrocarbonaceous fuel is a pumpable slurry of a solid carbonaceous fuel in a vaporizable liquid carrier from the group consisting of water, liquid hydrocarbon fuel, and mixtures thereof.

15. The process of claim 11 in which said hydrocarbonaceous fuel is a gaseous feedstock from the group consisting of methane, ethane, propane, butane, pentane, natural gas, coke-oven gas, refinery gas, acetylene tail gas, ethylene off-gas, and mixtures thereof.

16. The process of claim 11 in which said hydrocarbonaceous fuel is an oxygenated hydrocarbonaceous organic material from the group consisting of carbohydrates, cellulosic materials, aldehydes, organic acids, alcohols, ketones, oxygenated fuel oil, waste liquids and by-products from chemical processes containing oxygenated hydrocarbonaceous organic materials, and mixtures thereof.

17. The process of claim 11 in which said temperature moderator is selected from the group consisting of, $H_2O$, $CO_2$, $N_2$, cooled effluent gas from the gas generator, and mixtures thereof.

18. The process of claim 11 in which said free-oxygen containing gas is selected from the group consisting of air, oxygen-enriched-air i.e. greater than 21 mole % $O_2$, and substantially pure oxygen, i.e. greater than about 95 mole % oxygen.

19. The process of claim 11 wherein said liquid organic extractant is selected from the group consisting of (1) light liquid hydrocarbon fuels having an atomspheric boiling point in the range of about 100° to 750° F., density in degrees API in the range of over 20 to about 100, and a carbon number in the range of about 5 to 16; (2) mixture of substantially water insoluble liquid organic by-products from an oxo or oxyl process; and (3) mixtures of types (1) and (2).

20. The process of claim 11 wherein said liquid organic extractant is selected from the group consisting of butanes, pentanes, hexanes, toluol, natural gasoline, gasoline, naphtha, gas oil, and mixtures thereof.

21. The process of claim 11 wherein said heavy liquid hydrocarbon fuel has a gravity in degrees API in the range of about −20 to 20.

22. The process of claim 11 wherein said liquid aqueous emulsion comprises in wt. % water about 93, to 96, heavy liquid hydrocarbon about 0.05 to 0.5, naphthenic acid about 0.002 to 0.20, asphaltene or scale about 0.002 to 0.20, and the remainder liquid organic extractant.

23. In a partial oxidation process for producing gaseous mixtures comprising $H_2$, CO, $H_2O$, entrained particulate carbon and at least one material from the group $CO_2$, $H_2S$, COS, $CH_4$, $N_2$, $A_r$, and ash by the partial oxidation of a hydrocarbonaceous feed with a free-oxygen containing gas, optionally with a temperature moderator in a freeflow non-catalytic gas generator at a temperature in the range of about 1300° to 3000° F. and a pressure in the range of about 1 to 250 atm., cooling the effluent gas stream from said reaction zone and contacting said gas stream with water in gas quenching or cleaning operations, or both thereby removing said entrained particulate carbon and any ash and producing a clean gas stream and a carbon-water dispersion containing any ash, the improvement comprising: (1) mixing a liquid organic extractant with said carbon-water dispersion and separating in a decanting operation a liquid dispersion comprising extractant-particulate carbon-water containing at least one gaseous impurity from the group $N_2S$, $NH_3$, and $CO_2$, from a bottoms water layer containing at least one gaseous impurity from the group $H_2S$, $NH_3$, and $CO_2$; (2) mixing the extractant-carbon-water dispersion from (1) with a heavy liquid hydrocarbon; (3) heating the mixture from (2) above the vaporization temperature of water and said liquid extractant but below the boiling point of said heavy liquid hydrocarbon in a distillation zone, cooling the overhead vapor from said distillation zone to condense out and to separate in a separation vessel an upper layer of liquid organic extractant, an intermediate liquid layer of aqueous emulsion and a lower layer of water from an overhead stream of gaseous impurities; (4) removing a dispersion of heavy liquid hydrocarbon and particulate carbon from the bottom of said distillation zone and introducing same into said gas generator as a portion of the feed; (5) removing said liquid organic extractant from said separation vessel and recycling same to said decanting operation in (1); (6) removing said aqueous emulsion from said separation vessel in (3) and mixing same with said bottoms water layer from (1), breaking up said aqueous emulsion and introducing the resulting mixture into a flash column comprising at least one horizontal stripping plate and first and second chambers at the bottom of said flash chamber; (7) reclaiming the water separated in said separation vessel in (3) by introducing said water into said flash column; and (8) cooling the overhead stream from said flash column and condensing the normally liquid constituents, and introducing said cooled stream into said separation vessel.

24. The process of claim 23 provided with the steps of introducing said mixture of aqueous emulsion and water in step (6) into the flash column below the bottom stripping plate, vaporizing a portion of said mixture and passing the vapors through water contained on said horizontal stripping plate to produce stripped water; collecting the unvaporized portion of said mixture in a first chamber at the bottom of said flash column, collecting said stripped water and the overflow from said first-chamber in a second chamber at the bottom of said flash column; removing waste water containing ash from said first chamber and discharging same from the system; and removing reclaimed water from said second chamber and recycling same to said gas quenching or cleaning operations or both.

25. The process of claim 23 provided in (1) with the steps of mixing a portion of said liquid organic extractant with said carbon-water dispersion and introducing the mixture into the first-stage of a two-stage decanting operation, and simultaneously introducing the remainder of said organic extractant into the second-stage of said decanting operation.

26. Process for the simultaneous production of a clean gas mixture comprising $H_2$ and CO, and a clean $H_2$-rich gas stream comprising (1) reacting hydrocarbonaceous feed with substantially pure oxygen, in the presence of steam in the reaction zone of a free-flow noncatalytic partial-oxidation gas generator at a temperature in the range of about 1300° to 3000° F. and at a pressure in the range of about 1 to 250 atmospheres to produce an effluent gas stream comprising $H_2$, CO, $H_2O$, solid particles of carbon and ash and at least one gas from the group $CO_2$, $H_2S$, COS, $CH_4$, $N_2$ and $A_r$; (2) splitting the effluent gas stream from (1) into first and second gas streams, and simultaneously processing said first and second gas streams in separate first and second trains; (3) cooling said first gas stream from (2) in said first train by indirect heat exchange with boiler feed water in a gas cooler thereby producing steam; (4) cleaning the process gas stream from (3) in a first gas cleaning zone by contacting same with water, thereby producing a pumpable dispersion of solid particles and water; (5) cooling and condensing water from the process gas stream from (4) thereby producing a clean product gas stream comprising $H_2$ and CO; (6) cooling and cleaning said second gas stream from (2) by direct contact with water in a second gas quenching and cleaning zone thereby removing the solid particles entrained therein and producing a pumpable dispersion of solid particles and water while increasing the $H_2O$/CO mole ratio of said gas stream; (7) reacting together CO and $H_2O$ in the gas stream from (6) in a water gas shift conversion zone, and cooling and condensing water to produce a clean $H_2$-rich product gas stream; (8) mixing a liquid organic extractant and a liquid aqueous emulsion from (10) with said carbon-water dispersion, and breaking up said emulsion; separating in a decanting operation a liquid dispersion comprising extractant-particulate carbon-water containing at least one gaseous impurity from the group $H_2S$, $NH_3$, and $CO_2$, from a bottoms water layer containing entrained particulate carbon and any ash and at least one gaseous impurity from the group $H_2S$, $NH_3$, and $CO_2$; (9) mixing the extractant-carbon-water dispersion from (8) with a heavy liquid hydrocarbon; (10) heating the mixture from (9) above the vaporization temperature of water and said liquid extractant but below the boiling point of said heavy liquid hydrocarbon in a distillation zone, cooling the overhead vapor from said distillation zone to condense out and to separate in a separation vessel an upper layer of liquid organic extractant, an intermediate liquid layer of aqueous emulsion, and a lower layer of water from an overhead stream of gaseous impurities, if present; (11) removing a dispersion of heavy liquid hydrocarbon and particulate carbon from the bottom of said distillation zone and introducing same into said gas generator as a portion of the feed; (12) removing at least a portion of said liquid organic extractant and said liquid aqueous emulsion from said separation vessel and recycling same to said decanting operation in (8); and (13) introducing at reduced pressure the bottoms water from the decanting operation in step (8) below the bottom horizontal stripping plate in a flash column; vaporizing a portion of said bottoms water and passing the vapors through water contained on said horizontal stripping plate to produce stripped water; collecting the unvaporized portion of said bottoms water in a first chamber at the bottom of said flash column; collecting said stripped water and the overflow from said first chamber in a second chamber at the bottom of said flash column; removing waste water containing ash from said first chamber and discharging same from the system; removing reclaimed water from said second chamber and recycling same to said gas quenching or cleaning operations or both; and cooling the overhead from said flash column to below the dew point of the normally liquid constituents and separating water and liquid hydrocarbon in said separation vessel from gaseous impurities.

27. In a partial oxidation process for producing gaseous mixtures comprising $H_2$, CO, $H_2O$, entrained particulate carbon and at least one material from the group $CO_2$, $H_2S$, COS, $CH_4$, $N_2$, $A_r$, and ash by the partial oxidation of hydrocarbonaceous feed with a free-oxygen containing gas, optionally with a temperature moderator, in a free-flow non-catalytic gas generator at a temperature in the range of about 1300° to 3000° F. and a pressure in the range of about 1 to 250 atm., cooling the effluent gas stream from said reaction zone and contacting said gas stream with water in a gas quenching or cleaning operations, or both thereby removing said entrained particulate carbon and any ash and producing a clean gas stream and a carbon-water dispersion containing any ash, the improvement comprising: (1) mixing a liquid organic extractant from (3) with said carbon-water dispersion; separating in a decanting operation a liquid dispersion comprising extractant-particulate carbon-water containing at least one gaseous impurity from the group $H_2S$, $NH_3$, and $CO_2$, from a bottoms water layer containing entrained particulate carbon and any ash and at least one gaseous impurity from the group $H_2S$, $NH_3$, and $CO_2$; (2) mixing the extractant-carbon-water dispersion from (1) with a heavy liquid hydrocarbon; (3) heating the mixture from (2) above the vaporization temperature of water and said liquid extractant but below the boiling point of said heavy liquid hydrocarbon in a distillation zone, cooling the overhead vapor from said distillation zone to condense out and to separate in a first separation zone an upper layer of liquid organic extractant, an intermediate liquid layer of aqueous emulsion and a lower layer of water from an overhead stream of gaseous impurities; (4) removing a dispersion of heavy liquid hydrocarbon and particulate carbon from the bottom of said distillation zone and introducing same into said gas generator as a portion of the feed; (5) removing at least a portion of said liquid organic extractant from said first separation zone in (3) and recycling same to said decanting operation in (1); (6) removing said liquid aqueous emulsion from said first separation zone in (3) and heating same to break the emulsion, and in a second separation zone separating water, a liquid hydrocarbon mixture, and gaseous impurities; (7) introducing the water from said first and second separation zones into a flash column comprising at least one horizontal stripping plate and first and second chambers at the bottom of said flash chamber; (8) reclaiming the water separated in said first separation zone in (3) by introducing said water into said flash column; and (9) cooling the overhead stream from said flash column and condensing the normally liquid constituents and introducing said cooled stream into said first separation zone.

28. The process of claim 27 wherein the liquid hydrocarbon mixture from the second separation zone in (6) is mixed with the liquid extractant-carbon-water dispersion and heavy liquid hydrocarbon in (2) and the mixture is heated and introduced into the distillation zone in (3).

29. The process of claim 27 provided with the additional step of introducing the liquid hydrocarbon from said second separation zone in (6) into said gas generator.

30. The process of claim 27 provided with the additional steps of introducing at reduced pressure the bottoms water stream from the decanting operation in step (1) below a horizontal stripping plate in said flash column; vaporizing a portion of said bottoms water and passing the vapors through water contained on said horizontal stripping plate to produce stripped water; collecting the unvaporized portion of said bottoms water in said first chamber at the bottom of said flash column; collecting said stripped water and the overflow from said first chamber in said second chamber at the bottom of said flash column; removing waste water containing ash from said first chamber and discharging same from the system; removing reclaimed water from said second chamber and recycling same to said gas quenching or cleaning operations or both; and cooling the overhead from said flash column, condensing and separating water and liquid hydrocarbon in said first separation zone from gaseous impurities and introducing said condensed water on to a stripping tray in said flash column.

31. The process of claim 27 with the steps of mixing together the water from first and second separation zones and introducing said mixture on to a stripping tray in said flash column.

* * * * *